United States Patent [19]
Masser

[11] 3,921,999
[45] Nov. 25, 1975

[54] VEHICLE SUSPENSION CONSTRUCTION AND SUB-ASSEMBLY THEREFOR

[75] Inventor: Lloyd D. Masser, Muskegon, Mich.

[73] Assignee: Lear Siegler, Inc., Santa Monica, Calif.

[22] Filed: June 12, 1973

[21] Appl. No.: 369,132

[52] U.S. Cl. .......................... 280/104.5 R; 267/24
[51] Int. Cl.² ........................................... B60G 5/00
[58] Field of Search .. 280/104.5 R, 104.5 B, 112 R; 267/24, 31, 32

[56] References Cited
UNITED STATES PATENTS

| | | | |
|---|---|---|---|
| 2,777,529 | 1/1957 | Harbers | 280/104.5 R |
| 3,140,880 | 7/1964 | Masser | 280/104.5 R |
| 3,195,917 | 7/1965 | Baldock | 280/104.5 R |
| 3,233,915 | 2/1966 | Hamlet | 280/104.5 R |

*Primary Examiner*—Philip Goodman
*Assistant Examiner*—John A. Carroll
*Attorney, Agent, or Firm*—McGarry & Waters

[57] ABSTRACT

A recreational vehicle suspension system and air spring assembly wherein the frame beam on the vehicle has a first leaf spring operably mounted thereto and a first axle is mounted on the leaf spring. An air spring assembly is mounted in tandem to the leaf spring on the frame beam and mounts a second axle. The air spring suspension assembly includes in one embodiment a mounting plate which is secured to the frame beam in overlapping relationship with the leaf spring. A trailing arm is pivotably mounted on an axis transverse to the mounting plate on a depending support at a forward portion of the mounting plate. An air spring is mounted between the trailing arm and the mounting plate to cushion the movement of the trailing arm toward the mounting plate and a shock absorber damps the movement of the trailing arm toward and away from the mounting plate. A side flange on the mounting plate extends along the inner side of the beam opposite the leaf spring and a bottom flange on the mounting plate extends along the bottom of the beam. The shock absorber is secured to the side flange. With the air suspension assembly according to the invention, a leaf spring assembly and an air spring assembly can be mounted in tandem with a minimum space in between the wheels due to the overlapping of the two assembly systems. In another embodiment, the system is mounted in overlapping relationship to a leaf spring with the air spring, shock absorber, and the depending support being mounted directly to the frame. This latter embodiment is used on motor homes where the frame is much stronger than on van type vehicles.

12 Claims, 7 Drawing Figures

VEHICLE SUSPENSION CONSTRUCTION AND SUB-ASSEMBLY THEREFOR

BACKGROUND OF THE INVENTION

1. Field of the Invention

This invention relates to suspension systems for vehicles. In one of its aspects, the invention relates to an air spring suspension assembly which can be quickly and easily secured to an existing frame of a recreational vehicle. In another of its aspects, the invention relates to a suspension system for recreational vehicles and the like wherein a leaf spring and an air spring are mounted in tandem.

2. State of the Prior Art

The use of recreational vehicles has expanded considerably over the past few years. Many new and different types of recreational vehicles have been devised and are in use. Certain of these recreational vehicles are integral units and are known generally as motor homes. Other, somewhat smaller units, are made from van type vehicles and are generally known as mini-homes. Still other types of vehicles are trailers which are pulled behind a towing vehicle which may be a truck or car. Some of these recreational vehicles are relatively large and require more sophisticated suspension systems. With the larger types of recreational vehicles, two axles at the rear part of the vehicle are desirable for stability, load carrying ability, and braking.

Suspension systems for tandem axle vehicles are well known and have been used in the trucking industry for years. However, the recreational vehicles have different structural characteristics and different requirements than commercial tractor trailers and the like and such differences affect the ability to use the conventional suspension systems.

Of prime importance to the recreational vehicle industry is the interior layout. The vehicle must be low to the ground unlike commercial trailer vehicles and there must be a minimum of space taken up by the wheel well. Therefore, it becomes desirable to use small tires and to mount the tandem axles as close together as possible. The small tire and the minimum tire spacing also favorably affect turning ability and stability of the vehicle. The mini-home construction uses a relatively thin box beam as a structural frame component and a conventional leaf spring system is secured to the box beam. Mounting of two conventional leaf springs in tandem results in a relatively wide spacing between the wheels, thereby consuming excessive space within the vehicle for a wheel well.

Air spring assemblies offer significant advantages over the conventional leaf springs. It would be advantageous to combine an air spring assembly with a leaf spring assembly on a recreational vehicle frame. Such an assembly would allow equalization of load between the wheels without concern for interior layout. However, the conventional air spring assemblies attached in conventional fashion to the frame would result in a relatively wide spacing between the wheels in order to accommodate proper spacing of the mounting mechanisms on the frame beam, and, in some cases, may also result in weakening of the box beam frame by attachment of various suspension components to the beam. Conventionally, in the case of trailer vehicles, the suspension components are secured through bolting or welding of separate mounting plates to the trailer frame, but the separate mounting plates may overload the thin box beam and may not be structurally sufficient.

SUMMARY OF THE INVENTION

According to the invention, an improved suspension system and a suspension sub-assembly therefor has now been discovered which system permits the mounting of tandem axles with an air suspension system on a recreational vehicle wherein the low profile can be maintained while minimizing the spacing between the wheels. The air spring assembly according to the invention is overlapped with a leaf spring assembly and includes, in one embodiment, a mounting plate shaped for conformity with a structural beam of the van recreational vehicle. A trailing arm is pivotably mounted for rotation about an axis perpendicular to the longitudinal axis of the mounting plate and a spaced distance from the plate. An air spring is mounted between the trailing arm and the mounting plate for cushioning the movement of the trailing arm toward the mounting plate. Damping means are also connected at one end to the trailing arm and at the other end to the mounting plate to dampen the oscillation of the trailing arm with respect to the mounting plate. An axle is mounted on the trailing arm.

Desirably, the mounting plate is L-shaped in cross section with a side flange of the mounting plate extending along the inside surface of the structural frame beam. Thus, a conventional leaf spring assembly mounted on the outside of the beam can be overlapped with the air spring assembly without interference. The means for mounting the trailing arm includes a strengthening flange which extends along an opposite side of the beam from the side flange so that rigid portions of the air frame assembly are positioned on either side of the beam. The mounting plate is thus welded or otherwise secured to the frame beam and all of the assembly components are secured directly to the rigid mounting plate.

In one embodiment, the air spring is mounted on the free end portion of the trailing arm and the damping means is mounted on a central portion of the trailing arm. In another embodiment, the air spring is mounted on a central portion of the trailing arm and the damping means is mounted on the free end portion of the arm. In still another embodiment, the strengthening flange is mounted directly to the frame of a motor home in overlapping relationship to the leaf spring assembly and the unitary mounting plate is not used.

BRIEF DESCRIPTION OF THE DRAWINGS

The invention will now be described with reference to the accompanying drawings in which.

DESCRIPTION OF THE PREFERRED EMBODIMENTS

First Embodiment

Figure 1:
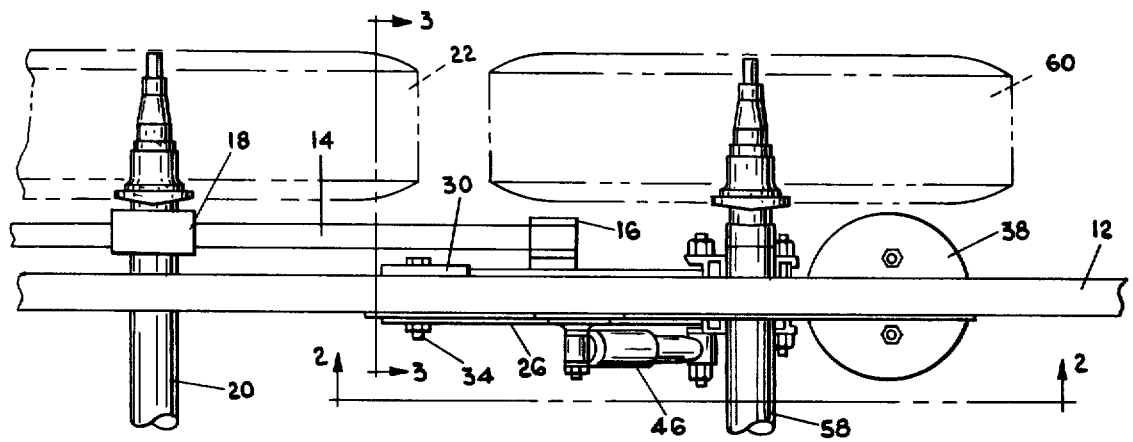
FIG. 1 is a plan view of a suspension system according to the invention mounted in tandem to a conventional leaf spring suspension on a travel vehicular frame.
Figure 2:
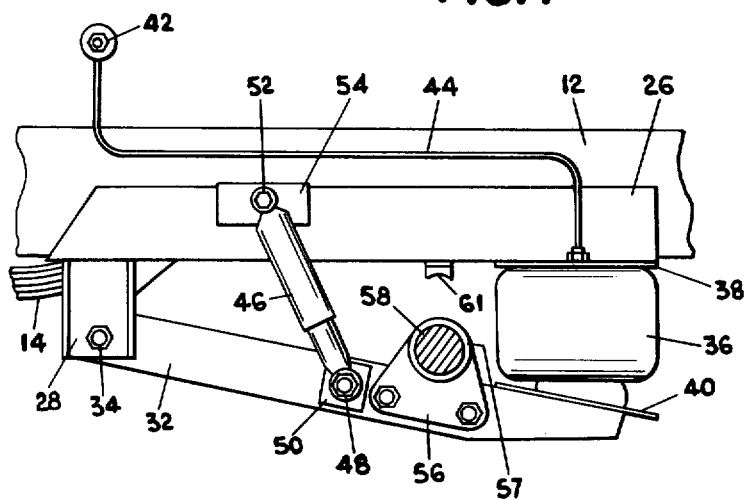
FIG. 2 is a sectional view taken along lines 2—2 of FIG. 1.
Figure 3:
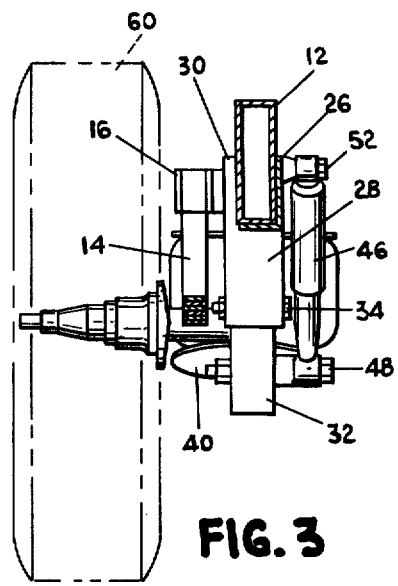
FIG. 3 is a sectional view taken along lines 3—3 of FIG. 1.

Referring now to the drawings and to FIGS. 1-3 in particular, there is shown a frame box beam 12 which is a portion of a frame of a vehicle suspension system used conventionally, for example, in mini-homes and some recreational trailers.

The invention will be described with respect to one side of a vehicle. It is obvious that an identical system is provided on an opposite side of the vehicle.

A conventional leaf spring assembly 14 is mounted at one end to a mounting bracket 16 in conventional fashion and has an axle 20 secured to the leaf spring 14. The other end of the leaf spring 14 is secured to the frame box beam 12 in conventional fashion as, for example, the mounting bracket 16. A wheel 22 shown in phantom lines in FIG. 1 is mounted on the axle 18. The foregoing is a description of a conventional leaf spring mounting assembly used on recreational vehicles. In the drawings, the front of the vehicle would be toward the left in FIGS. 1 and 2.

According to the invention, an air spring mounting assembly is provided in a unique manner so that it can be mounted in tandem fashion to the leaf spring suspension. The assembly provides a system whereby the wheels can be spaced fairly close together and the vehicle frame is not weakened. The air spring mounting assembly includes an L-shaped bracket 26 which is secured by welding, for example, to the inside and bottom of the frame box beam 12. A depending mounting bracket 28 extends downwardly from a rear portion of the L-shaped bracket 26 and pivotally mounts one end of a trailing arm 32 at a bottom portion thereof through axle bolt 34. As illustrated in FIG. 3, a frame flange 30 on the mounting bracket 28 extends along the outside edge of the frame box beam 12 and is welded thereto for secure mounting of the air spring frame assembly to the box beam 12. The frame flange 30 in combination with L-shaped bracket 26 tend to strengthen the frame box beam 12 to provide a strong and secure mounting for the air spring assembly without weakening the beam 12.

An air spring 36 is mounted at the other end of the trailing arm 32 opposite the mounting bracket 28 on a mounting plate 40. The upper portion of the air spring 36 is secured to the L-shaped bracket 26 through a mounting plate 38. An air valve 42 is provided to supply air to and exhaust air from the air spring 36 through air line 44. Normally, the air valve 42 is connected to a compressor (not shown) which supplies pressure to the air spring. The air valve 42 desirably is controlled from the cab of the vehicle so that the pressure in the air springs can be controlled by the operator in the cab.

A shock absorber 46 is pivotably mounted at a bottom portion to a mounting plate 50 through a pivotable mounting 48. The plate 50 is welded to the trailing arm 32. The upper end of the shock absorber 46 is securely mounted to the L-shaped bracket 26 through pivotable mounting 52 and plate 54, the latter of which is welded to the bracket 26. An axle 58 mounting a wheel 60 (shown in phantom lines in FIGS. 1 and 2) is mouned on the arm 32 between the shock absorber 46 and the air spring 36 on mounting plates 56. A rubber bumper 61 is secured to the bottom of the L-shaped bracket 26 and above the axle 58 to prevent inadvertent contact between the axle and the undersideof the L-shaped bracket 26. Preferably, the axle 58 is secured to the plates 56 and the plates are secured to the arm 32 through rubber bushings to allow a limited amount of movement of the axle 58 with respect to the trailing arm 32. This slight movement reduces tire scuffing and facilitates steering.

The air spring mounting assembly is assembled as a unit, i.e. with all parts (with or without the axle 58) mounted on the L-shaped bracket 26. The assembly is then quickly and easily secured to the frame box beam 12 in perfectly aligned position by placing the L-shaped bracket 26 in a proper position on the box beam and welding the same thereto.

In operation, the air spring will cushion the upward movement of the trailing arm 32 with respect to the bracket 26 and the shock absorber 46 dampens the downward movement of the trailing arm 32 with respect to the bracket 26.

Second Embodiment

Figure 4:
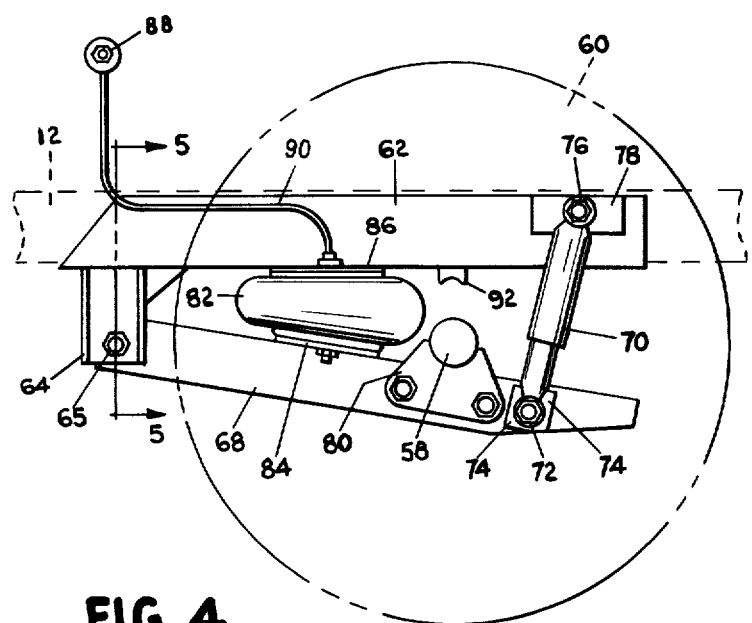
FIG. 4 is a side elevational view of a suspension system illustrating a second embodiment of the invention.
Figure 5:
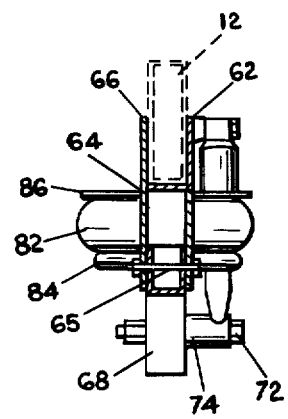
FIG. 5 is a sectional view along lines 5—5 of FIG. 4.

Reference is now made to FIGS. 4 and 5 which illustrate a second embodiment of the invention. In the second embodiment the air spring is mounted at a central portion of the trailing arm whereas the shock absorber is mounted at a lower end of the arm. For purposes of illustration, the box beam 12 has been shown in phantom lines to illustrate the unitized feature of the entire assembly.

Referring to FIGS. 4 and 5, an L-shaped bracket 62 has a depending mounting bracket 64 with an upstanding frame flange 66 at one side thereof so that the frame flange 66 and the L-shaped bracket are positioned at opposite sides of the box beam 12 to which the assembly is secured. A trailing arm 68 is pivotal mounted to the bottom of the depending moun bracket 64 through suitable axle bolt 65. A shock absorber 70 is pivotably mounted at a bottom portion of the arm 68 through a pivotable mounting 72 on a mounting plate 74. The upper portion of the shock absorber 70 is pivotably mounted to the L-shaped bracket 62 through a pivotable mounting 76 on mounting pla 78.

Axle mounting plates 80 are bolted to the arm 68 and secure the axle 58, shown in phantom lines in FIG. 4, to the arm 68. An air spring 82 has a mounting plate 84 at the bottom portion thereof through which the air spring 82 is mounted to a central portion of the arm 68. The upper end of the air spring 82 is secured to a mounting plate 86 which in turn is secured to the bottom of the L-shaped bracket 62 whereby the air spring 82 is secured between the L-shaped bracket 62 and the arm 68. An air valve 88 controls the air pressure in air spring 82 through air line 90. A rubber bumper 92 is provided on the bottom of the L-shaped bracket 62 above the axle 58 to prevent bumping of the axle on the underside of the L-shaped bracket 62.

In operation, road bumps encountered by the wheels 60 will cause upward and downward movement of axle 58, whereby the arm 68 will rotate about its pivotable mounting at the axle bolt 65. The movement of the arm in the up direction will be cushioned by the air spring 82 and by the shock absorber 70 when the arm moves downwardly.

The air spring assembly according to the invention provides a simple and effective suspension system for recreational vehicles. The mounting plate provides added strength to the vehicle frame and mounts all of the parts of the subassembly. Thus, the sub-assembly is easily and quickly secured to the frame through welding or other conventional fastening techniques. No special adaptation must be made to the vehicle frame in order to accommodate the air spring assembly.

Further, the air spring sub-assembly is particularly suited for tandem mounting along with conventional leaf spring assemblies on recreational vehicles, although such use of the assembly is not so restricted. The assembly provides a neat and simple system which can be overlapped with conventional leaf spring assemblies so that distance between the tandem axles is minimized. Further, the air spring assembly is lighter in weight and therefore minimizes vehicle weight design problems and power requirements. The height of the system is low and permits the use of smaller wheels to improve cornering and allow greater latitude in interior layout.

The air suspension systems provide a means by which the weight in the vehicles can be equalized and give improved stability to the vehicle.

The suspension system can thus be mounted securely and easily to any existing trailer frame without unreasonable weight characteristics The rigid trailing arms give the vehicle a very low degree of roll and thus increase the stability thereof.

The air suspension system permits adjustment of axle loads and height adjustment by adjusting the air pressure in the air springs. Further, the amounts of air in each air spring can be separately adjusted for side to side leveling which permits greater design freedom for the interior of the vehicle.

Third Embodiment

Figure 6:
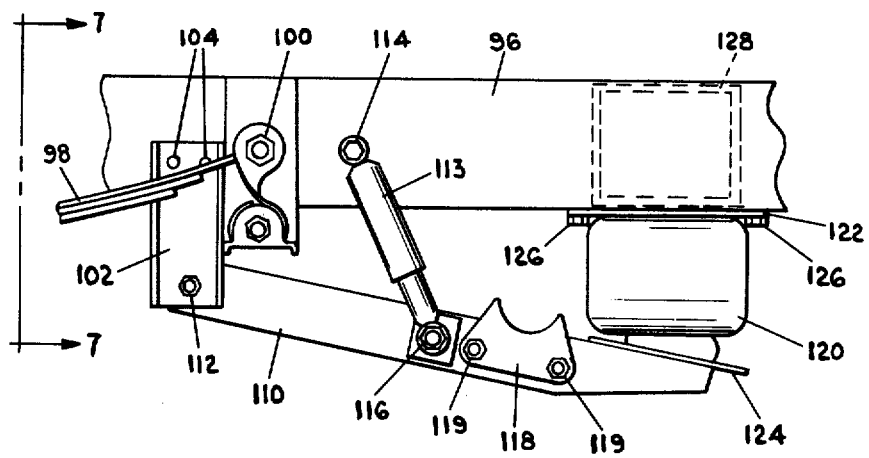
FIG. 6 is a side elevational view of a suspension system illustrating a third embodiment of the invention.
Figure 7:
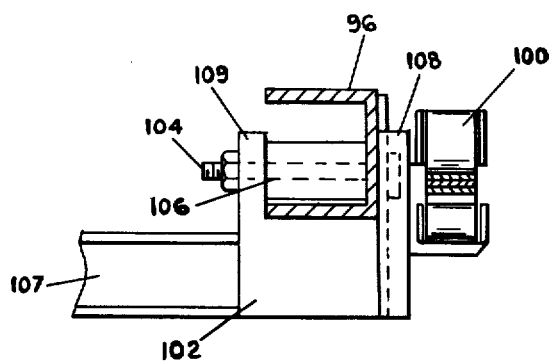
FIG. 7 is a partial view taken along lines 7—7 of FIG. 6.

Reference is now made to FIGS. 6 and 7 which illustrate a third embodiment of the invention. In this embodiment, the assembly is substantially the same as the first embodiment with the exception that the L-shaped mounting bracket has not been used and the various components of the air spring assembly have been mounted directly onto the frame in overlapping relationship with a leaf spring. Such a construction is desirable with the motor homes which use significantly higher strength structures than the van type minihomes.

Referring now specifically to FIGS. 6 and 7, the vehicle frame contains a U-shaped beam 96 and mounts a leaf spring 98 through a conventional leaf spring mounting bracket 100. The suspension system is viewed from the left side of the vehicle with the front of the vehicle being toward the left as viewed in FIG. 6.

A depending mounting bracket 102 is mounted forwardly of the leaf spring mounting bracket 100 and is secured to the U-shaped beam 96 through bolts 104. The mounting bracket 102 is rectangular in cross section and is cut away at one side to conform with the shape of the beam 96. As seen in FIG. 7, a strengthening flange 108 extends up alongside the outside of the beam 96 and an inner reinforcing flange 109 extends up along the inside of the beam 96. The bolts 104 extend through the filler 106 and flange 109, and are secured thereto for firm mounting of the mounting bracket 102 on the U-shaped beam 96. A brace 107 is welded to the bottom of the bracket 102 and extends beneath the vehicle to the bottom of a corresponding bracket on the opposite side of the vehicle.

A trailing arm 110 is pivotably mounted through axle bolt 112 to a bottom portion of the depending mounting bracket 102. A shock absorber 113 is pivotably mounted on its upper end to the U-shaped beam 96 through a pivotable mounting 114 and is pivotably mounted at its lower end through pivotable mounting 116 to a central portion of the trailing arm 110. Mounting plates 118 are secured to the trailing arm 110 through bushed bolts 119 for mounting an axle on the trailing arm 110. The bushed bolts provide a controlled degree of movement between the mounting plates 118 and the trailing arm 110 for controlled independent movement of one side of the axle with respect to the other. Such bushed connections between the axle mounting plates and the trailing arms are well known in the suspension art.

An air spring 120 is secured to the trailing arm 110 through a mounting plate 124 and to the underside of the U-shaped beam 96 through mounting plate 122 and bolts 126. Desirably, a cross beam 128, shown in phantom lines in FIGS. 6, extends between opposing U-shaped beams 96 above the air spring mounting plate 122 to rigidify the frame and to provide additional mounting surface for the air spring mounting plate 122.

The system illustrated in FIGS. 6 and 7 operates in substantially the same manner as the system illustrated in FIGS. 1-3. The overlapping of the air spring and leaf spring mounting assemblies provide the shorter wheel base between the tandem axles to minimize loss of interior space due to the wheel well. The shorter wheel base also decreases load transfer between tandem axles and decreases tire scuffing.

Reasonable variation and modification are possible within the scope of the foregoing disclosure, drawings, and the appended claims without departing from the spirit of the invention.

The embodiments of the invention in which an exclusive property or privilege is claimed are defined as follows:

1. In a recreational vehicle suspension system wherein the vehicle has a frame beam, a leaf spring is operably mounted to said frame beam, and a first axle is mounted to said leaf spring; the improvement which comprises:
   a mounting plate secured to said frame beam in overlapping relationship with said leaf spring;
   a rigid trailing arm;
   means rigidly secured to said mounting plate and depending from a forward portion thereof forwardly of a rear mounting of said leaf spring for pivotably mounting one end of said trailing arm a spaced distance below said mounting plate, said trailing arm being pivotably mounted to a lower portion of said mounting means; a second axle mounted on said trailing arm;
   an air spring mounted between said trailing arm and said mounting plate to cushion the movement of said trailing arm toward said mounting plate; and
   means connected at one end to said mounting plate and at the other end to said trailing arm to dampen the oscillation of said trailing arm with respect to said mounting plate.

2. A recreational vehicle suspension system according to claim 1 wherein said mounting plate has a side flange which extends along a side of said beam and a bottom flange which extends beneath said beam.

3. A recreational vehicle suspension system according to claim 2 wherein said oscillation damping means is secured to said side flange, and said flange is positioned along the inner side of said beam, opposite said leaf spring.

4. A recreational vehicle suspension system according to claim 2 wherein said trailing arm mounting means includes a strengthening flange which extends along an opposite side of said beam from said side flange, whereby said air spring assembly is rigidly secured to said frame beam.

5. A recreational vehicle suspension system according to claim 1 wherein said air spring is mounted on an end portion of said trailing arm and said damping means is mounted on a central portion of said trailing arm.

6. A recreational vehicle suspension system according to claim 1 wherein said air spring is mounted on a central portion of said trailing arm and said damping means is mounted on a free end portion of said arm.

7. An air spring assembly for mounting onto the frame of a recreational vehicle, said assembly comprising:
- a mounting plate having a longitudinal axis and shaped for rigid mounting on a structural beam, said mounting plate having a side flange and a bottom flange;
- a depending bracket rigidly secured to one end of said mounting plate;
- a rigid trailing arm;
- means pivotably mounting said trailing arm on a lower end of said depending bracket for rotation about an axis perpendicular to the longitudinal axis of the mounting plate and a spaced distance therefrom, said trailing arm mounting means including an upwardly extending stiffening flange parallel to but spaced from said side flange of said mounting plate so that said mounting plate and said upwardly extending flange can straddle said structural beam;
- means for mounting an axle on said trailing arm;
- an air spring means between said trailing arm and said mounting plate for cushioning movement of said trailing arm toward said mounting plate; and
- damping means connected to said trailing arm and to said mounting plate to dampen the movement of said trailing arm away from said mounting plate;

whereby said mounting assembly can be quickly and easily mounted onto a structural beam without modification thereto and without weakening said structural beam.

8. An air spring assembly according to claim 7 wherein said air spring is mounted on a free end portion of said trailing arm and said damping means is mounted on a central portion of said trailing arm.

9. An air spring assembly according to claim 7 wherein said air spring is mounted on a central portion of said trailing arm and said damping means is mounted on a free end portion of said arm.

10. In a recreational vehicle suspension system wherein the vehicle has a frame beam, a leaf spring is operably mounted to said frame beam through at least a rear mounting bracket, and a first axle is mounted to said leaf spring, the improvement which comprises:
- a rigid trailing arm;
- bracket means, rigidly mounted to said frame forwardly and independently of said rear mounting bracket of said leaf spring, for pivotably mounting one end of said trailing arm a spaced distance below said frame beam and below said rear mounting plate of said leaf spring so that said trailing arm is in overlapping relationship with said leaf spring;
- a second axle mounted on said trailing arm;
- an air spring mounted between said trailing arm and said mounting plate to cushion the movement of said trailing arm toward said mounting plate; and
- means connected at one end to said mounting plate and at the other end to said trailing arm to dampen the oscillation of said trailing arm with respect to said mounting plate.

11. A recreational vehicle suspension system according to claim 10 wherein said pivotable mounting means includes a flange which extends upwardly along-side of said frame beam.

12. A recreational vehicle suspension system according to claim 10 wherein said leaf spring is mounted to the outside of said frame beam, said trailing arm is suspended beneath said frame beam, and said oscillation dampening means is mounted to the outside of said frame beam.

* * * * *